United States Patent
Sambhwani et al.

(10) Patent No.: US 10,397,864 B2
(45) Date of Patent: Aug. 27, 2019

(54) ENABLING LOW POWER MODE IN A MOBILE DEVICE

(71) Applicant: QUALCOMM Incorporated, San Diego, CA (US)

(72) Inventors: Sharad Sambhwani, San Diego, CA (US); Hao Xu, San Diego, CA (US); Durga Prasad Malladi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 58 days.

(21) Appl. No.: 15/472,506

(22) Filed: Mar. 29, 2017

(65) Prior Publication Data
US 2018/0014251 A1  Jan. 11, 2018

Related U.S. Application Data

(60) Provisional application No. 62/358,501, filed on Jul. 5, 2016.

(51) Int. Cl.
*H04W 52/02*  (2009.01)
*H04L 5/00*  (2006.01)
*H04W 4/70*  (2018.01)

(52) U.S. Cl.
CPC ....... *H04W 52/0212* (2013.01); *H04L 5/0055* (2013.01); *H04W 4/70* (2018.02); *H04W 52/0216* (2013.01); *H04W 52/0229* (2013.01); *H04W 52/0235* (2013.01); *Y02D 70/00* (2018.01); *Y02D 70/1242* (2018.01);
(Continued)

(58) Field of Classification Search
CPC ............... H04W 52/0212; H04W 4/70; H04W 52/0216; H04W 52/0229; H04W 52/0235; H04L 5/0055
See application file for complete search history.

(56) References Cited

U.S. PATENT DOCUMENTS

2012/0327885 A1  12/2012  Chung et al.
2013/0016687 A1  1/2013  Yang et al.
(Continued)

OTHER PUBLICATIONS

International Search Report and Written Opinion—PCT/US2017/038857—ISA/EPO—dated Nov. 22, 2017.
(Continued)

*Primary Examiner* — Eric Myers
(74) *Attorney, Agent, or Firm* — Arent Fox, LLP

(57) ABSTRACT

In an aspect of the disclosure, a method, a computer-readable medium, and an apparatus are provided. The apparatus operates in a first power mode with a first DL bandwidth in association with one of a radio resource control (RRC) idle state or an RRC connected state with a base station. The apparatus transitions to a second power mode with a second DL bandwidth less than the first DL bandwidth. Additionally, the apparatus monitors a set of symbols and a set of subcarriers of the second DL bandwidth for an activity indicator from the base station. The apparatus transitions from the second power mode to the first power mode upon receiving the activity indicator from the base station. In an aspect, control information associated with a modulation scheme may be within the set of symbols and the set of subcarriers. The control information may correspond to a particular constellation point.

24 Claims, 11 Drawing Sheets

(52) U.S. Cl.
CPC ........ *Y02D 70/1262* (2018.01); *Y02D 70/142* (2018.01); *Y02D 70/144* (2018.01); *Y02D 70/162* (2018.01); *Y02D 70/20* (2018.01); *Y02D 70/21* (2018.01); *Y02D 70/24* (2018.01); *Y02D 70/26* (2018.01)

(56) References Cited

U.S. PATENT DOCUMENTS

2015/0201376 A1    7/2015  Webb et al.
2018/0160361 A1*  6/2018  Yi ..................... H04W 72/042

OTHER PUBLICATIONS

Partial International Search Report—PCT/US2017/038857—ISA/EPO—dated Sep. 1, 2017.

* cited by examiner

ENABLING LOW POWER MODE IN A MOBILE DEVICE

CROSS-REFERENCE TO RELATED APPLICATION(S)

This application claims the benefit of U.S. Provisional Application Ser. No. 62/358,501, entitled "ENABLING LOW POWER MODE DOWNLINK RECEIVER IN LONG TERM EVOLUTION (LTE)" and filed on Jul. 5, 2016, which is expressly incorporated by reference herein in its entirety.

BACKGROUND

Field

The present disclosure relates generally to communication systems, and more particularly, to a communication systems including a low power mode.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

LTE, 5G/NR, or other communication technology may be used with the Internet of Things (IoT)/Internet of Everything (IoE). The IoT/IoE is the network of embedded devices associated with physical things, such as devices in vehicles, buildings, and other items. The embedded devices may include electronics, software, sensors, actuators, and network connectivity that enable these objects to collect and exchange data. The embedded devices associated with physical things may be battery powered. In some cases, the battery power available for the embedded devices associated with physical things may be limited. Accordingly, there is benefit to improving active power consumption for these embedded devices.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

As LTE cellular technology continues to be used beyond smartphones to the IoT/IoE, continued improvements in power consumption may benefit a number of devices in the IoT/IoE space with limited battery capacity (e.g., sensors, actuators, wearables devices, and other IoT/IoE devices). While recent LTE features such as power savings mode and extended discontinuous reception (extended-DRX) address device power consumption well during very long periods of inactivity, further enhancements may be used for MTC (machine type communication) and NB-IoT capable UEs (or even higher UE categories) in the area of active power consumption during a connected state. The enhancements described herein may improve the active power consumption of such devices. For example, the enhancements described herein may improve the active power consumption even with a connected discontinuous reception (C-DRX) feature enabled in a connected state. For example, the enhancements described herein may allow for a low power mode for a downlink (DL) receiver during periods of inactivity for C-DRX.

In an aspect, UEs may switch between two power states via an indicator that may indicate periods of activity and/or inactivity. During periods of inactivity a UE may transition to a low power mode of operation where the UE may monitor a control channel on a limited number of resource blocks, e.g., a single tone or sub-carrier. When the UE detects activity, the UE may transition out of the low power mode of operation to a normal mode of operation.

In an aspect of the disclosure, a method, a computer-readable medium, and an apparatus are provided. The apparatus operates in a first power mode with a first DL bandwidth in association with one of a radio resource control (RRC) idle state or an RRC connected state with a base station. The apparatus transitions to a second power mode with a second DL bandwidth less than the first DL bandwidth. Additionally, the apparatus monitors a set of symbols and a set of subcarriers of the second DL bandwidth for an activity indicator from the base station. The apparatus transitions from the second power mode to the first power mode upon receiving the activity indicator from the base station.

In an aspect, the apparatus may be further configured to receive control information from the base station within the set of symbols and the set of subcarriers in the second DL bandwidth. The control information may be associated with a modulation scheme. The received control information may correspond to a particular constellation point of a set of constellation points associated with the modulation scheme. The apparatus may determine that the activity indicator is received when the received control information is determined to correspond to the particular constellation point.

In an aspect, the apparatus may be further configured to transmit a repetition of an uplink (UL) communication to the base station while in the first power mode. The set of symbols and the set of subcarriers of the second DL bandwidth are further monitored for an acknowledgment (ACK) to the UL communication from the base station. The apparatus may receive the ACK from the base station while monitoring the set of symbols and the set of subcarriers of the second DL bandwidth. Receiving the ACK may be prior to transmitting a last repetition of the UL communication and while in the second power mode. The apparatus may refrain, upon receiving the ACK from the base station, from transitioning from the second power mode to the first power mode in order to continue transmitting the repetition of the UL communication.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
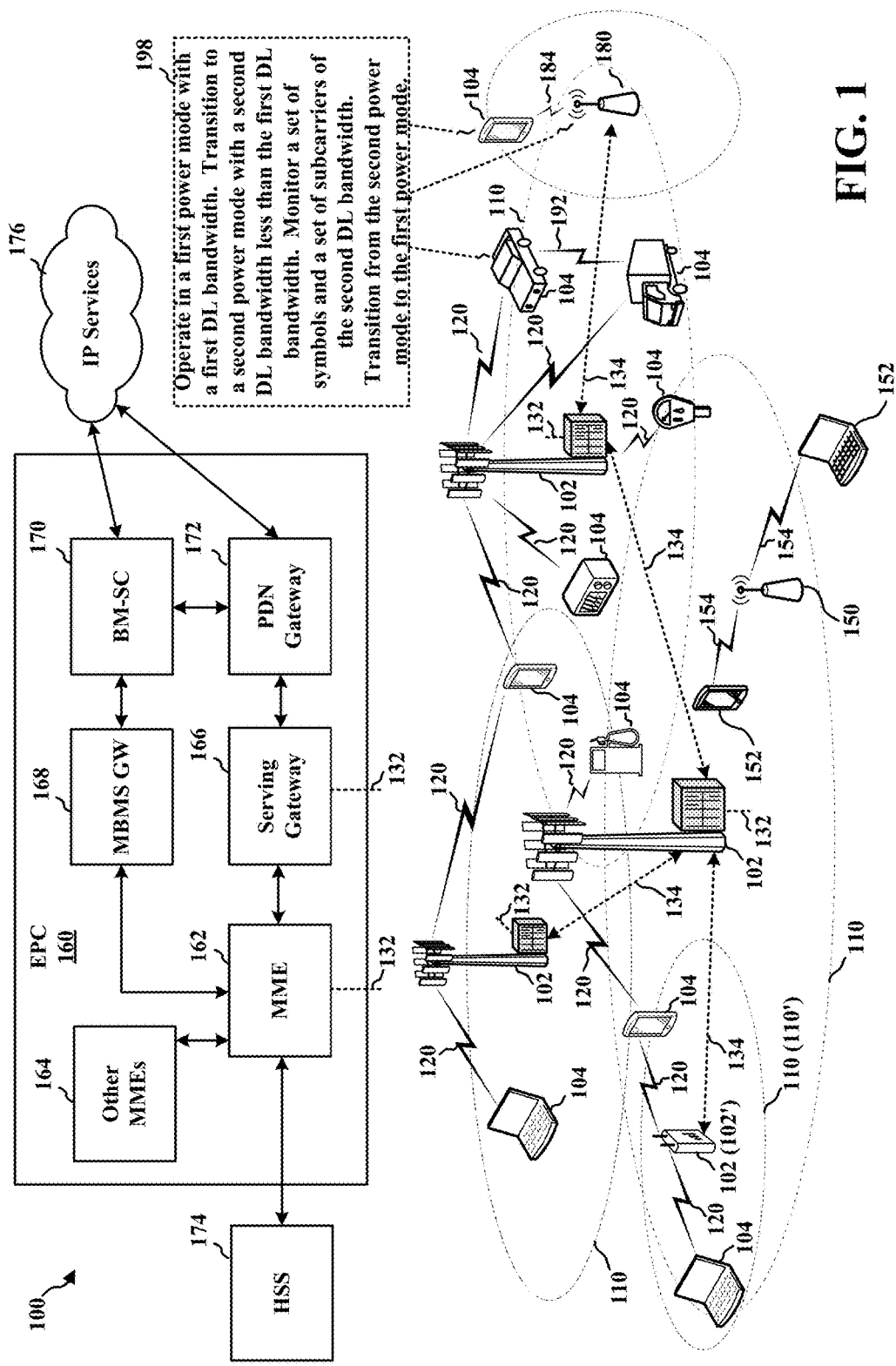
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Some aspects described herein may enable a low power mode for a downlink receiver. The downlink receiver may be for LTE or for other communication systems. In some aspects, the low power mode may address power consumption issues of enhanced machine type communication (eMTC) devices, narrow band Internet of Things (NB-IoT) devices, or both eMTC and NB-IoT devices. In an aspect, a device may use narrowband control signals or single tone monitoring allowing devices to save power used for control signals. In another aspect, a device may use constellation points from a communication process to allow for multiple user multiplexing on a single tone. In yet another aspect, a device may use eNB early termination.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to, and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

As discussed above, some aspects described herein may enable a low power mode for a downlink receiver. In an aspect, the UE 104 may use narrowband control signals or single tone monitoring of control signals to save power. Such a UE 104 may switch between a regular control channel and a narrowband control channel based on communication activity. In an aspect, after a period of inactivity, the UE 104 may switch from the regular control channel to the narrowband control channel. The UE 104 may switch back from the narrowband control channel to the regular control channel when activity is received on the narrowband control channel.

For example, referring again to FIG. 1, in certain aspects, the UE 104 may be configured to operate in a first power mode with a first DL bandwidth in association with one of a RRC idle state or an RRC connected state with a base station. The UE 104 may be configured to transition to a second power mode with a second DL bandwidth less than the first DL bandwidth. The first power mode may be a high power mode relative to the second (low) power mode. For example, the first power mode may be a regular operational mode for a UE. The regular operational mode for the UE may use more power than the second power mode. The second power mode may be a low power mode that monitors a control channel on a limited number of resource blocks to, for example, conserve battery power consumption.

The UE 104 may be configured to monitor a set of symbols and a set of subcarriers of the second DL bandwidth for an activity indicator from the base station. The UE 104 may be configured to transition from the second power mode to the first power mode upon receiving the activity indicator from the base station (198). Thus, the UE 104 may use narrowband control signals or single tone monitoring of control signals to save power. The UE 104 may switch to the regular control channel when activity is received on the narrowband control channel.

Figure 2:
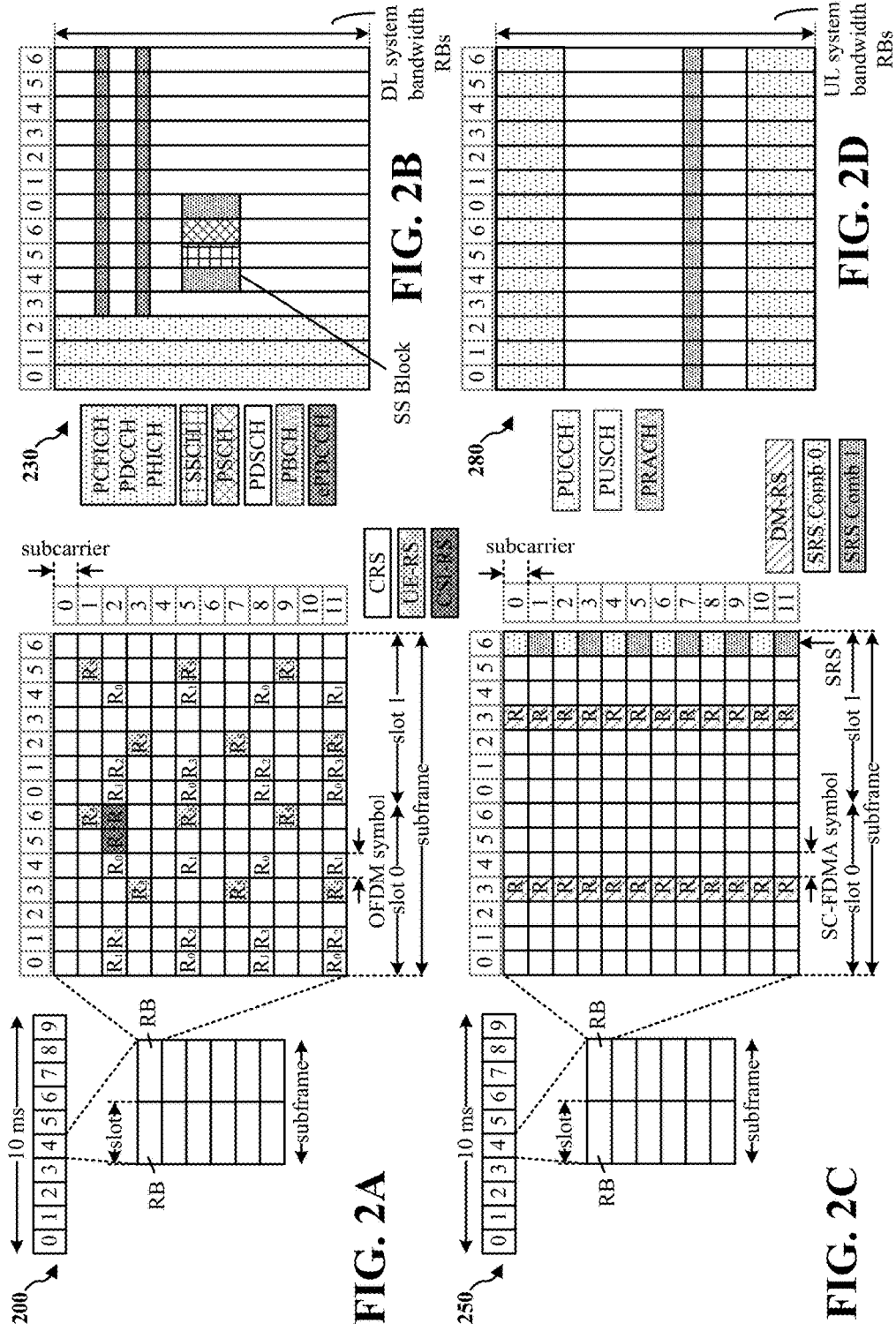
FIGS. 2A, 2B, 2C, and 2D are diagrams illustrating LTE examples of a DL frame structure, DL channels within the DL frame structure, a UL frame structure, and UL channels within the UL frame structure, respectively.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
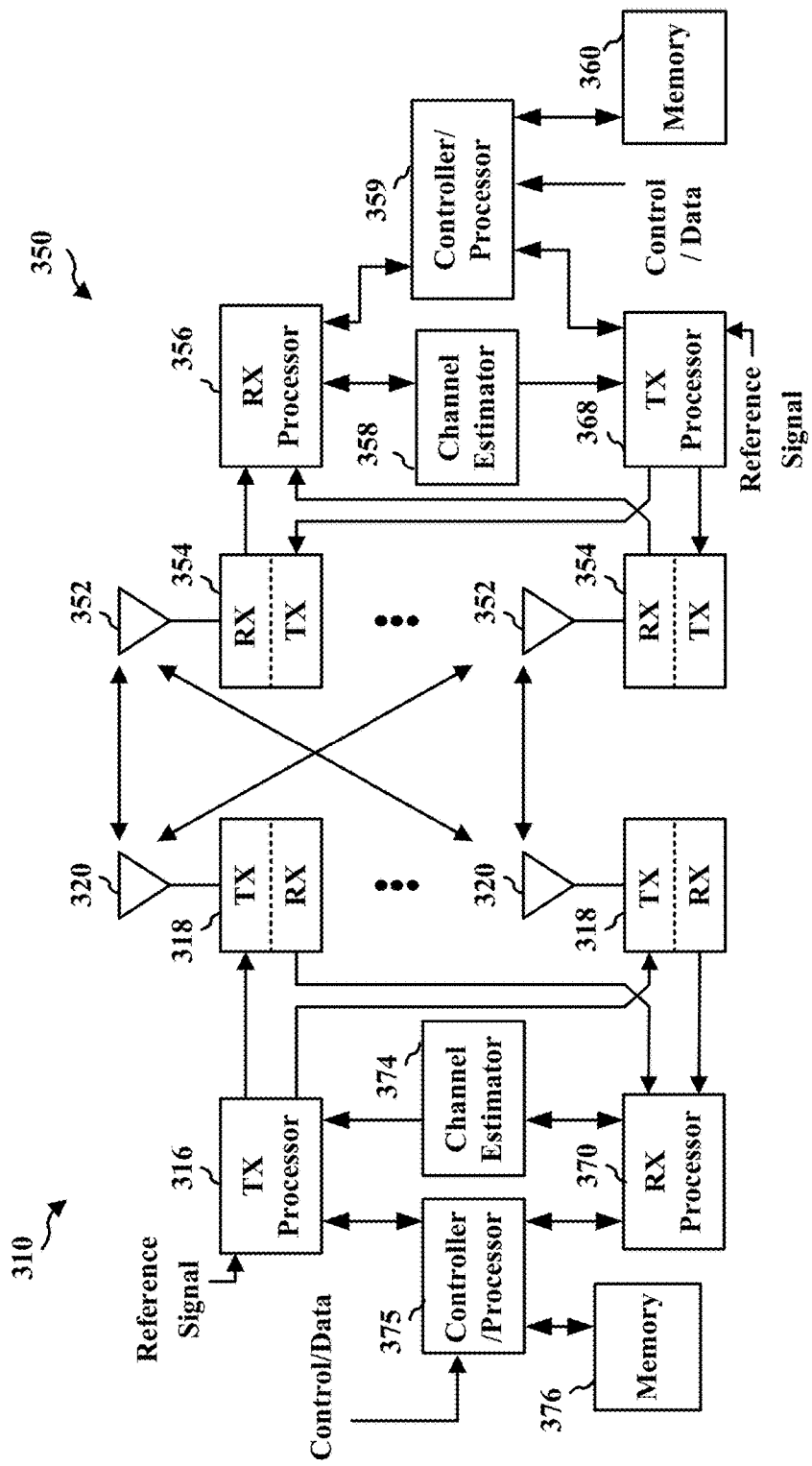
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal-processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
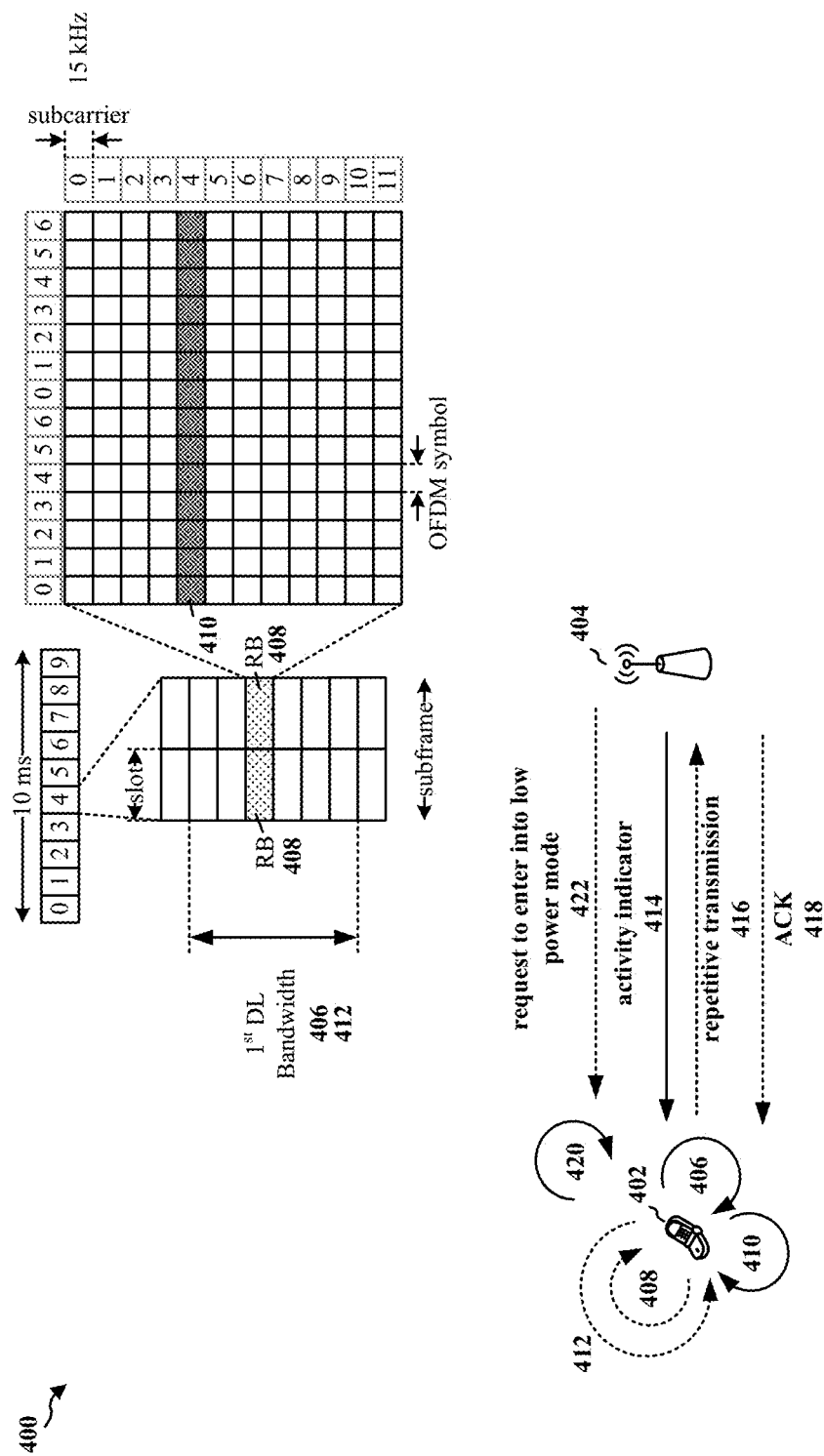
FIG. 4 is a diagram of a device-to-device communications system in accordance with the systems and methods described herein.

FIG. 4 is a communications system 400. The communications system 400 includes a UE 402 and a base station 404, which may correspond to UE 350 and eNB 310 in FIG. 3 or to apparatus 1002 and eNB 1050 in FIG. 10. Communications system 400 may correspond to communications system 100 in FIG. 1. The communications system 400 may overlap with a cellular communications system, such as for example, a WWAN. The UE 402 may communicate using the DL/UL WWAN spectrum with other UEs and with the base station 404. The communication may be through one or more sidelink channels, such as a physical sidelink broadcast channel (PSBCH), a physical sidelink discovery channel (PSDCH), a physical sidelink shared channel (PSSCH), and a physical sidelink control channel (PSCCH).

The exemplary methods and apparatuses discussed infra are applicable to any of a variety of wireless communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

As illustrated in FIG. 4, the UE 402 operates 406 in a first power mode. The first power mode may be a high power mode (as compared to a second mode). Additionally, the first power mode has a first DL bandwidth. The first DL bandwidth may be a high bandwidth (as compared to a second bandwidth for the second mode). Furthermore, the first DL bandwidth is in association with one of an RRC idle state or an RRC connected state with a base station. Examples of low bandwidth may include bandwidths of 15 kHz to 180 kHz or 360 kHz. Examples of high bandwidth may include bandwidths much greater than 360 kHz, such as approximately 5 to 100 MHz or greater.

The UE 402 transitions 408 to a second power mode. The second power mode may be a lower power mode than the first power mode. Additionally, the second power mode has a second DL bandwidth. The second DL bandwidth may be less than the first DL bandwidth.

The UE 402 monitors 410 a set of symbols and a set of subcarriers of the second DL bandwidth. The set of symbols may be orthogonal frequency-division multiplexing (OFDM) symbols. The UE 402 monitors 410 the set of symbols and the set of subcarriers of the second DL bandwidth for an activity indicator 414 from the base station 404.

The UE 402 transitions 412 from the second power mode to the first power mode upon receiving the activity indicator 414 from the base station 404.

In an example, the UE 402 transmits 416 a repetition of a UL communication to the base station 404 while in the first power mode. The set of symbols and the set of subcarriers of the second DL bandwidth may further be monitored 420 for an ACK to the UL communication from the base station 404. The UE may receive 418 the ACK from the base station while monitoring 420 the set of symbols and the set of subcarriers of the second DL bandwidth, prior to transmitting a last repetition of the UL communication, and while in the first power mode. The UE 402 may refrain, upon receiving the ACK 418 from the base station 404, from transitioning from the first power mode to the second power mode in order to continue transmitting the repetition of the UL communication 416.

In an example, the UE 402 may transmit 416 a repetition of a UL communication to the base station 404 while in the first power mode. The UE 402 may monitor 410 the second DL bandwidth for an ACK 418 to the UL communication from the base station 404. The UE 402 may receive the ACK 418 from the base station 404 while monitoring 410 the second DL bandwidth and prior to transmitting 416 a last repetition of the UL communication. The UE 402 may refrain, upon receiving the ACK 418 from the base station 404, from continuing the transmitting of the repetition of the UL communication.

As described herein, during periods of inactivity in a connected state, the UE 402 may transition 408 to allow power mode of operation. In the low power mode of operation, the UE 402 may monitor a control channel (e.g., MPDCCH or equivalent). The UE 402 may monitor the control channel on a limited number of resource block pairs (RB) (e.g., 1 in the illustrated example, or 2 or more in other examples), subcarrier(s), or tone(s). In other examples, the UE 402 may be assigned a single tone or sub-carrier to monitor. By monitoring the control channel on a limited number of resource block pairs (RB), the UE 402 may operate the UE's 402 front end (e.g., receiver) in a narrow bandwidth (e.g., 15 kHz to 180 kHz or 360 kHz) thereby conserving battery consumption.

While monitoring 410 the control channel on a limited resource set, the UE 402 may primarily look for an activity indicator 414 which indicates to the UE 402 that the network (e.g., including base station 404), will schedule data to the UE 402 in the near future. When the UE 402 detects the activity indicator 414, the UE 402 may revert to a higher power receiver configuration. In the receiver configuration, the UE 402 may be scheduled based on the UE's 402 normal category and capabilities (e.g., CAT-M1, NB-IoT or higher).

The UE 402 may transition 412 out of the low power and normal mode of operation based on inactivity timers running at both the UE 402 and network (e.g., base station 404) or based on explicit signaling 422 (e.g., page, DL assignment, UL grant, or other indicator) between the network (e.g., base station 404) and the UE 402. In the former case, when an inactivity timer expires, the UE 402 may switch (e.g., transition 408) to the low power mode. Thereafter, when the UE 402 detects activity, the UE 402 may immediately switch (e.g., transitions 412) to normal mode of operation. The inactivity timer may be reset every time the UE 402 is scheduled with data on either downlink or uplink.

The UE 402 may be preconfigured with relevant configuration information relevant to both modes of operation. In a case where the UE 402 monitors a single sub-carrier or tone during the low power mode of operation, the UE 402 may still be configured in conjunction with a hopping pattern as in the eMTC feature to combat the effects of frequency selective fading. Furthermore, in order to increase the degree of statistical multiplexing, multiple users may be configured on the same sub-carrier with each user assigned to monitor a specific constellation point of the symbol that is mapped to a carrier. For example, assuming QPSK modulation, user A may be configured to monitor constellation point (1,1) while user B may be configured to monitor (1,−1) and so on.

In another aspect, the base station 404 (e.g., eNB) may send an ACK 418 at an early instant in time as soon as the base station 404 decodes a repeated transmission (e.g., UL communication 416) (as would be the case in any of coverage enhancements A and B) on the uplink. In other words, the base station 404 may perform early decoding at some known instant and may send an ACK (ON/OFF keying) 418 when uplink has been decoded (Uplink Frame Early termination). The early decoding and ACK performed by the base station 404 may help reduced UL interference. The ACK 418 may be sent on the same channel that the UE 402 uses to monitor MPDCCH or equivalent. When the UE 402 is configured to monitor the activity indicator on a single tone and constellation point, the ACK could also be assigned to be monitored on the same resource. Monitoring a control channel for an activity indicator on a limited resource set need not be confined to a UE 402 configured in an RRC connected state. Monitoring a control channel for an activity indicator on a limited resource may also be applied to a non-connected state such as an idle state.

Figure 5:
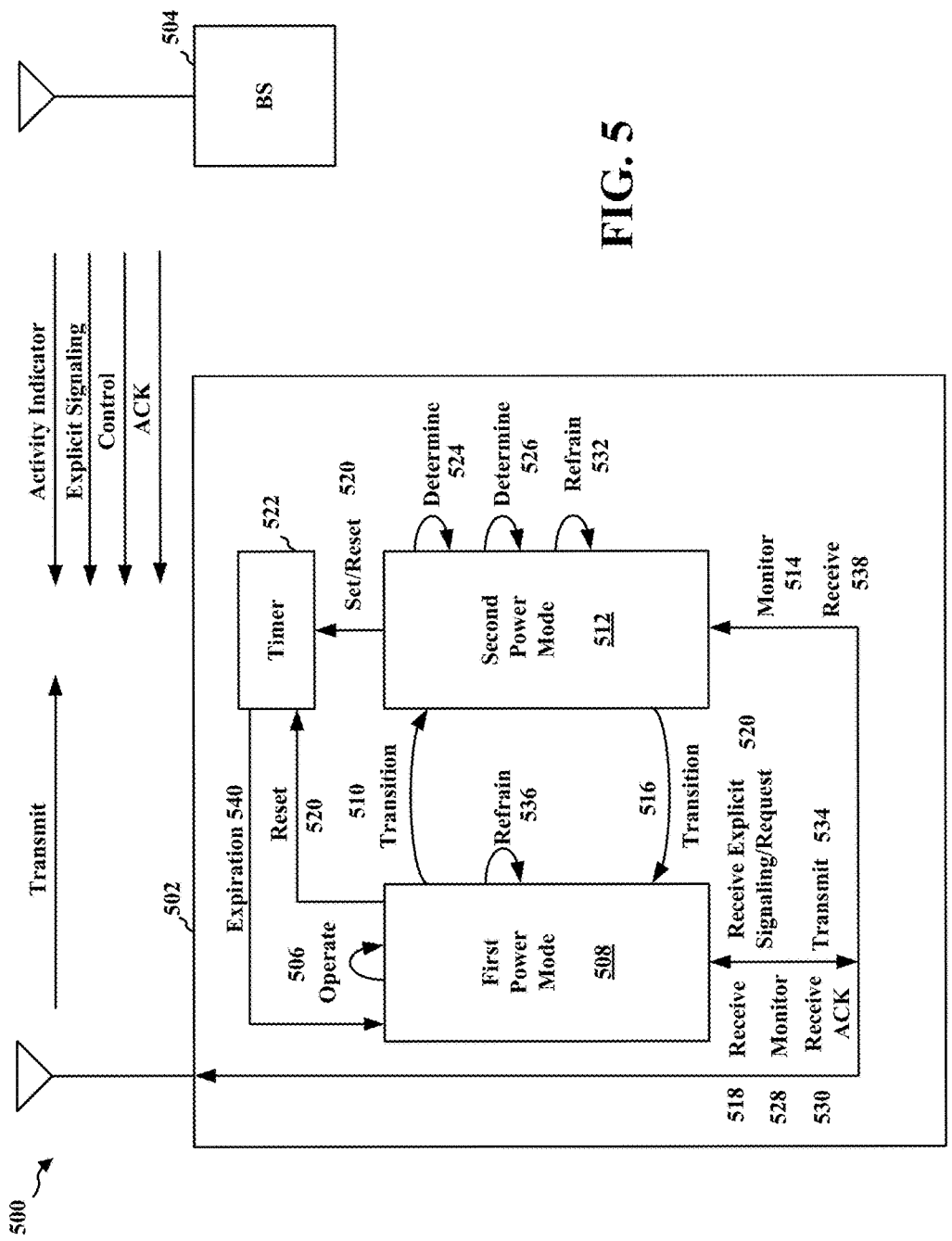
FIG. 5 is a diagram of an example device communicating with a base station in accordance with the systems and methods described herein.

FIG. 5 is a diagram 500 of an example device (e.g., a UE 502) communicating with a base station 504 in accordance with the systems and methods described herein. The UE 502 may be an apparatus for wireless communication (e.g., UE 103, 350, 402, apparatus 1002). The UE 502 may be configured to operate 506 in a first power mode 508 with a first DL bandwidth in association with one of an RRC idle state or an RRC connected state with a base station 504. The UE 502 may be configured to transition 510 to a second power mode 512 with a second DL bandwidth less than the first DL bandwidth. The UE 502 may be configured to monitor 514 a set of symbols and a set of subcarriers of the second DL bandwidth for an activity indicator from the base station 504. Additionally, the UE 502 may be configured to transition 516 from the second power mode 512 to the first power mode 508 upon receiving 518 the activity indicator from the base station 504.

In an example, the UE 502 may be configured to set 520 an inactivity timer 522. The UE 502 transitions 510 to the second power mode 512 upon expiration 540 of the inactivity timer 522. In an example, the UE 502 may be configured to reset 520 the inactivity timer 522 upon being scheduled with data on the DL or a UL with the base station 504.

In an example, the UE 502 may be configured to receive 538 explicit signaling from the base station 504 indicating a request to transition to the second power mode 512. The UE 502 may transition 510 to the second power mode 512 upon receiving the request to transition 510 to the second power mode 512.

In an example, the UE 502 may be configured to receive control information from the base station 504 within the set of symbols and the set of subcarriers in the second DL bandwidth. The control information may be associated with a modulation scheme. The UE 502 may be configured to determine 524 whether the received control information corresponds to a particular constellation point (or is mapped to multiple constellation points) of a set of constellation points associated with the modulation scheme. Additionally, the UE 502 may be configured to determine 526 that the activity indicator is received when the received control information is determined to correspond to the particular constellation point (or multiple constellation points). In an example, the set of symbols includes all symbols (or all available symbols) in a subframe, and the set of subcarriers comprises one of 12 subcarrier or 24 subcarriers in the subframe.

In an example, the UE 502 may be configured to transmit 528 a repetition of a UL communication to the base station 504 while in the first power mode 508. The set of symbols and the set of subcarriers of the second DL bandwidth may be further monitored 528 for an ACK to the UL communication from the base station 504. Additionally, the UE 502 may be configured to receive the ACK 530 from the base station 504 while monitoring the set of symbols and the set of subcarriers of the second DL bandwidth, prior to transmitting a last repetition of the UL communication, and while in the second power mode 512. The UE 502 may be further configured to refrain 536 from operating 506, transitioning 510, or resetting 520 the inactivity timer 522.

The UE 502 may be configured to refrain 532, upon receiving the ACK 530 from the base station 504, from transitioning 516 from the second power mode 512 to the first power mode 508 in order to continue transmitting 534 the repetition of the UL communication.

In an example, the UE 502 may be configured to transmit 534 a repetition of a UL communication to the base station 504 while in the first power mode 508. The UE 502 may be configured to monitor 528 the second DL bandwidth for an ACK to the UL communication from the base station 504. The UE 502 may be configured to receive the ACK 530 from the base station 504 while monitoring 528 the second DL bandwidth and prior to transmitting 534 a last repetition of the UL communication. The UE 502 may be configured to refrain 532, upon receiving the ACK 530 from the base station 504, from continuing the transmitting 534 of the repetition of the UL communication.

As described herein, an example UE 104, 350, 402, 502 may use narrowband monitoring or single tone monitoring to save power. The UE 104, 350, 402, 502 may switch from a regular control signal to a narrowband control signal or to single tone monitoring of control signals when communication activity is low. The UE 104, 350, 402, 502 may switch between the regular control channel and the narrowband control channel based on communication activity. The device may switch back from the narrowband control channel to the regular control channel when activity is received on the narrowband control channel.

Thus, an apparatus for wireless communication, e.g., UE 104, 350, 402, 502, may include a memory and at least one processor coupled to the memory. The at least one processor may be configured to operate in a first power mode with a first DL bandwidth in association with one of a RRC idle state or an RRC connected state with a base station. The at least one processor may also be configured to transition to a second power mode with a second DL bandwidth less than the first DL bandwidth. Additionally, the at least one processor may be configured to monitor a set of symbols and a set of subcarriers of the second DL bandwidth for an activity indicator from the base station. The at least one processor may also be configured to transition from the second power mode to the first power mode upon receiving the activity indicator from the base station.

In an example, operating in the first power mode may include operating in a LTE category machine type communication (MTC) one (Cat-M1) mode or an LTE category NB1 (Cat-NB1) mode.

In an example, operating in the first power mode may include operating in a MTC devices or NB-IoT devices In an example, the first DL bandwidth may be 1.08 MHz when operating in the LTE Cat-M1 mode, and may be 180 kHz when operating in the LTE Cat-NB1 mode.

In an aspect, after a period of inactivity, the UE 104, 350, 402, 502 may switch from a regular control channel and a narrowband control channel. For example, the at least one processor may be configured to set an inactivity timer, wherein the UE transitions to the second power mode upon expiration of the inactivity timer. The at least one processor may also be configured to reset the inactivity timer upon being scheduled with data on the DL or a UL with the base station.

An example may reset an inactivity timer upon receiving a DL assignment or an uplink (UL) grant.

In another example, the at least one processor may be configured to receive explicit signaling from the base station indicating a request to transition to the second power mode. The UE may transition to the second power mode upon receiving the request to transition to the second power mode.

In an example, the set of symbols and the set of subcarriers monitored in the second DL bandwidth may hop between subframes to different subcarriers within the second DL bandwidth.

In an example, the at least one processor may be configured to receive control information from the base station within the set of symbols and the set of subcarriers in the second DL bandwidth, the control information being associated with a modulation scheme. The at least one processor may also be configured to determine whether the received control information corresponds to a particular constellation point of a set of constellation points associated with the modulation scheme. Additionally, the at least one processor may be configured to determine that the activity indicator is received when the received control information is determined to correspond to the particular constellation point.

Thus, a device such as a UE 104, 350, 402, 502 may use constellation points to allow for multiple user multiplexing. A system may use a single symbol to transmit "wake up" signaling to one of multiple user devices (e.g., UEs 104, 350, 402, 502). "Wake up signaling" may be signaling that causes a device to switch from a low power mode to another, generally higher power mode, e.g., cause the device to "wake up." The system may signal each of the multiple devices, one at a time, based on a constellation point selected. Accordingly, in an aspect, a system may map constellation points to a series of user devices (e.g., UEs 104, 350, 402, 502). Each constellation point may be mapped to one user device.

QPSK is a form of Phase Shift Keying that may modulate two bits at once by selecting one of four possible carrier phase shifts (e.g., 0, 90, 180, or 270 degrees). Each one of the four possible carrier phase shifts may be mapped to a user device. As a specific example, when QPSK is used, for wake up signaling, each one of four possible constellation points may be mapped to a particular user device, one device per QPSK constellation point. When the user device picks up energy on the one of the four possible constellation points mapped to a user device, the user device may interpret the energy on the one of four possible constellation points (carrier phase shifts) mapped to the user device as a paging signal for the particular user device mapped to that constellation point. Accordingly, the user device may "wake up," e.g., the device may transition from narrowband control/ single tone monitoring to a regular control channel or regular channel monitoring. The transition may be based on the occurrence of communication activity.

In an example, the set of subcarriers may include one subcarrier or the set of subcarriers may include a series of subcarriers of a frequency hopping pattern wherein multiple activity indicator from the base station are received over the series of subcarriers before a determination is made that the activity indicator has been received. For example, a UE may be configured to receive an activity indicator multiple times before the UE deems that the activity indicator was sent. The UE may rely on majority logic or soft combining of a bit to boost the reliability of the bit before the UE declares that the activity indicator was sent. In this case, the received activity bit may have been received on different sub-carriers in examples including a frequency hopping pattern assigned for the sub-carrier(s) being monitored.

In an example, the set of symbols may include all symbols in a subframe, and the set of subcarriers may include one of 12 subcarrier or 24 subcarriers in the subframe.

In an example, the set of symbols and the set of subcarriers monitored may further include hopping between subframes to different subcarriers within a system bandwidth.

In an example, the set of symbols and the set of subcarriers monitored in the second DL bandwidth may hop between subframes to different subcarriers within a DL bandwidth.

In an example, the at least one processor may be configured to transmit a repetition of a UL communication to the base station while in the first power mode, wherein the set of symbols and the set of subcarriers of the second DL bandwidth are further monitored for an ACK to the UL communication from the base station. The at least one processor may also be configured to receive the ACK from the base station while monitoring the set of symbols and the set of subcarriers of the second DL bandwidth, prior to transmitting a last repetition of the UL communication, and while in the second power mode. Additionally, the at least one processor may be configured to refrain, upon receiving the ACK from the base station, from transitioning from the second power mode to the first power mode in order to continue transmitting the repetition of the UL communication.

In an example, the at least one processor may be configured to transmit a repetition of a UL communication to the base station while in the first power mode. The at least one processor may also be configured to monitor the second DL bandwidth for an ACK to the UL communication from the base station. Additionally, the at least one processor may also be configured to receive the ACK from the base station while monitoring the second DL bandwidth and prior to transmitting a last repetition of the UL communication. The at least one processor may also be configured to refrain, upon receiving the ACK from the base station, from continuing the transmitting of the repetition of the UL communication.

In an example, the second DL bandwidth corresponds to a MPDCCH.

Figure 6:
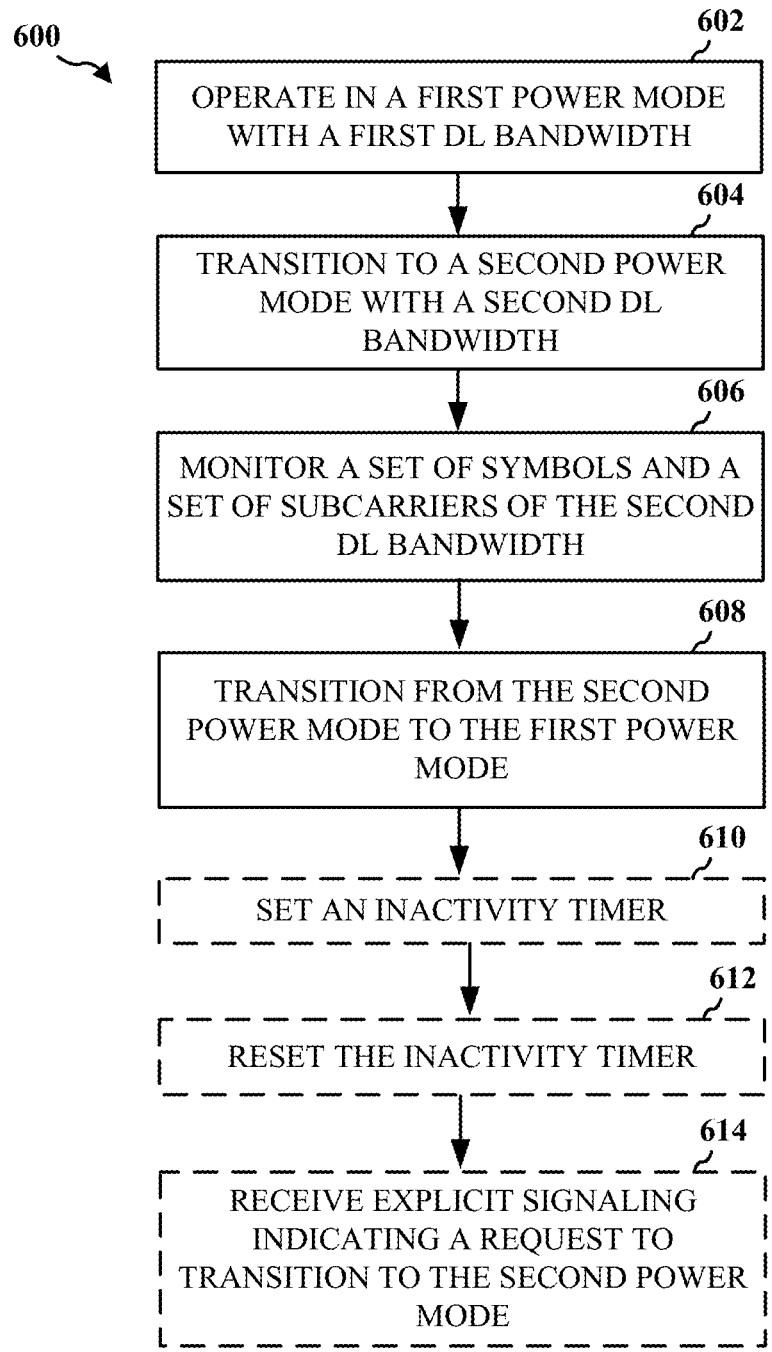
FIG. 6 is a flowchart of a method of wireless communication in accordance with the systems and methods described herein.

FIG. 6 is a flowchart 600 of a method of wireless communication in accordance with the systems and methods described herein. The method may be performed by a UE (e.g., the UE 104, 350, 402, 502).

At block 602, the UE operates in a first power mode with a first DL bandwidth in association with one of a RRC idle state or an RRC connected state with a base station. For example, the UE 104, 350, 402, 502 operates 406, 506 in a first power mode 508 with a first DL bandwidth in association with one of a RRC idle state or an RRC connected state with a base station. The first power mode may be a mode used by a regular control channel having a number of tones and/or a bandwidth used with a regular control channel, e.g., for LTE or other communications standards.

At block 604, the UE transitions to a second power mode with a second DL bandwidth less than the first DL bandwidth. For example, the UE 104, 350, 402, 502 transitions 408, 510 to the second power mode 512 with the second DL bandwidth less than the first DL bandwidth. For example, the UE 104, 350, 402, 502 may operate using use narrowband control signals or single tone monitoring of control signals to save power. The UE 104, 350, 402, 502 may transition 408, 510 to the second power mode 512 with a second DL bandwidth less than the first DL bandwidth during a period of inactivity. After a period of inactivity, the UE 104 may switch from the regular control channel to the narrowband control channel.

At block 606, the UE monitors a set of symbols and a set of subcarriers of the second DL bandwidth for an activity indicator from the base station. For example, the UE may 104, 350, 402, 502 monitor 410, 514 a set of symbols and a set of subcarriers of the second DL bandwidth for an activity indicator 414 from the base station 102, 310, 404, 504. The UE 104, 350, 402, 502 may monitor for activity received on the narrowband control channel. The monitoring at block 606 may include monitoring for a constellation point as described with respect to FIG. 7 discussed below.

At block 608, the UE transitions from the second power mode to the first power mode upon receiving the activity indicator from the base station. For example, the UE may transition 412, 516 from the second power mode 512 to the first power mode 508 upon receiving 518 the ACK 418 from the base station 102, 310, 404, 504. For example, the UE 104, 350, 402, 502 may switch back from the narrowband control channel to the regular control channel when activity is received on the narrowband control channel. Thus, the UE 104 may use narrowband control signals or single tone monitoring of control signals to save power, e.g., when activity is low (such as after no activity is received for a period of time). The UE 104 may switch to the regular control channel when activity is received on the narrowband control channel.

At block 610, the UE may sets an inactivity timer. The UE transitions to the second power mode upon expiration of the inactivity timer. For example, the UE 104, 350, 402, 502 sets 520 an inactivity timer 522. The UE 104, 350, 402, 502 transitions 510 to the second power mode 512 upon expiration of the inactivity timer 522. Determine activity or inactivity may be determined based on the inactivity timer. The inactivity timer 522 expiring may indicate that no activity has occurred during a predetermined period of time.

At block 612, the UE may reset the inactivity timer upon being scheduled with data on the DL or a UL with the base station. For example, the UE 104, 350, 402, 502 may reset 520 the inactivity timer 522 upon being scheduled with data on the DL or a UL with the base station 102, 310, 404, 504. An expiring inactivity timer 522 may indicate that no activity has occurred during a predetermined period of time. Resetting 520 the inactivity timer 522 may keep the inactivity timer 522 from expiring. An inactivity timer 522 that does not expire provides an indication that activity is occurring.

At block 614, the UE may receive explicit signaling from the base station indicating a request to transition to the second power mode. The UE transitions to the second power mode upon receiving the request to transition to the second power mode. For example, the UE 104, 350, 402, 502 receives 422, 538 explicit signaling from the base station 102, 310, 404, 504 indicating a request to transition to the second power mode 512. The UE 402, 502 transitions 510 to the second power mode 512 upon receiving 422, 538 the request to transition to the second power mode 512.

Accordingly, the method of FIG. 6 may enable a low power mode for a downlink receiver. In an aspect, the UE 104, 350, 402, 502 may use narrowband control signals or single tone control signals to save power. Such a UE 104, 350, 402, 502 may switch between the regular control channel and the narrowband control channel based on communication activity. In an aspect, after a period of inactivity, the UE 104 may switch from the regular control channel to the narrowband control channel, thereby saving power because transmitting or receiving using the narrowband control channel may use less power.

Figure 7:
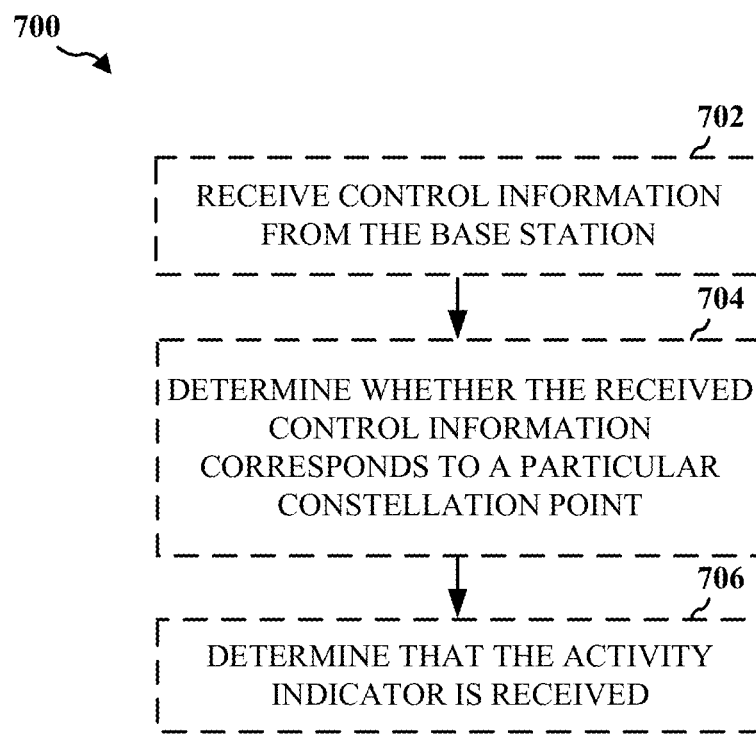
FIG. 7 is a flowchart of a method of wireless communication in accordance with the systems and methods described herein.

FIG. 7 is a flowchart 700 of a method of wireless communication in accordance with the systems and methods described herein. The method may be performed by a UE (e.g., the UE 104, 350, 402, 502). The monitoring at block 606 of FIG. 6 discussed above may include monitoring for a constellation point as described with respect to blocks 702, 704, and 706.

At block 702, the UE receives control information from the base station within the set of symbols and the set of subcarriers in the second DL bandwidth. The control information may be associated with a modulation scheme. For example, the UE 104, 350, 402, 502 may receive 518 control information from the base station 102, 310, 404, 504 within the set of symbols and the set of subcarriers in the second DL bandwidth.

At block 704, the UE may determine whether the received control information corresponds to a particular constellation point of a set of constellation points associated with the modulation scheme. For example, the UE 104, 350, 402, 502 may determine 524 whether the received control information corresponds to a particular constellation point of a set of constellation points associated with the modulation scheme. Thus, a device such as a UE 104, 350, 402, 502 may use constellation points to allow for multiple user multiplexing.

At block 706, the UE may determine that the activity indicator is received when the received control information is determined to correspond to the particular constellation point. For example, the UE 104, 350, 402, 502 may determine 526 that the activity indicator 414 is received when the received control information is determined to correspond to the particular constellation point. The received control information may be transmitted by a device implementing the systems and methods described herein. For example, an eNB 102, 310, 404, 504 may use a single symbol to transmit "wake up" signaling to one of multiple user devices (e.g., UEs 104, 350, 402, 502). The eNB 102, 310, 404, 504 may signal each of the multiple devices (UEs 102, 310, 404, 504), one at a time, based on a constellation point selected. Accordingly, in an aspect, eNB 102, 310, 404, 504 may map constellation points to a series of user devices (e.g., UEs 104, 350, 402, 502).

Thus, the method of FIG. 7 may use constellation points to allow for multiple user multiplexing. The method may transmit "wake up" signaling using a single symbol. Each wake up transmission may be transmitted for one of multiple user devices (e.g., UEs 104, 350, 402, 502), e.g., each constellation point may be mapped to one of four devices using QPSK. The method may signal each of the multiple devices, (e.g., UEs 104, 350, 402, 502), one at a time, based on a constellation point selected. In an aspect, a system may map constellation points to a series of user devices (e.g., UEs 104, 350, 402, 502). Each constellation point may be mapped to one user device.

Figure 8:
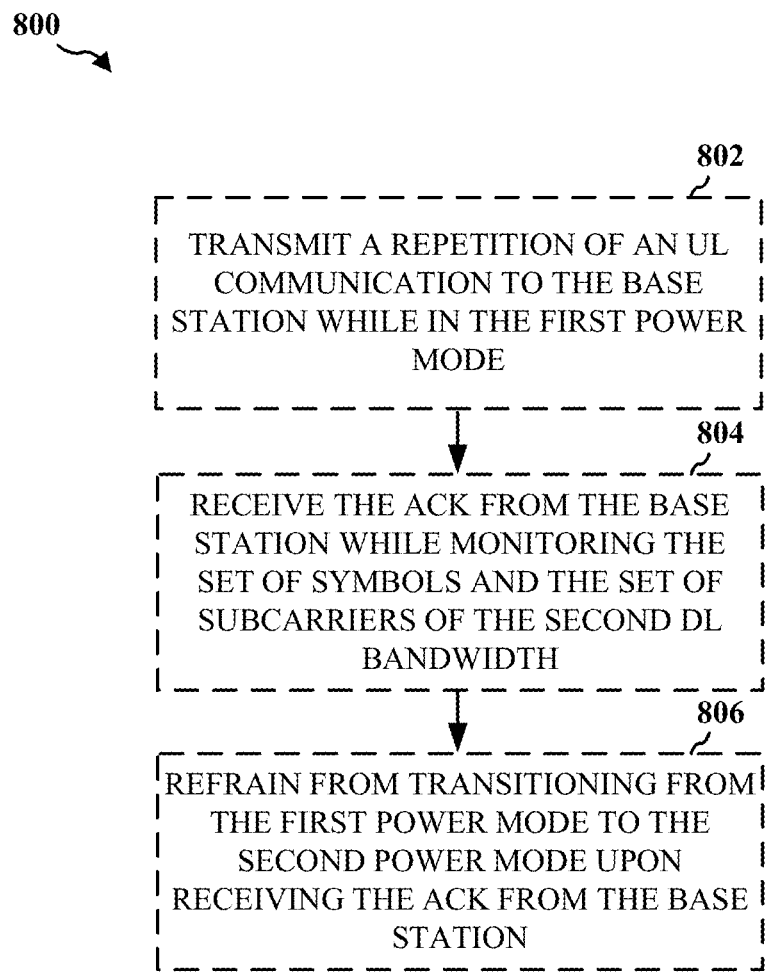
FIG. 8 is a flowchart of a method of wireless communication in accordance with the systems and methods described herein.

FIG. 8 is a flowchart 800 of a method of wireless communication in accordance with the systems and methods described herein. The method may be performed by a UE (e.g., the UE 104, 350, 402, 502).

At block 802, the UE transmits a repetition of a UL communication to the base station while in the first power mode. The set of symbols and the set of subcarriers of the second DL bandwidth may be further monitored for an ACK to the UL communication from the base station. For example, the UE 104, 350, 402, 502 may transmit 416, 534 a repetition of a UL communication to the base station 102, 310, 404, 504 while in the first power mode 508. The set of symbols and the set of subcarriers of the second DL bandwidth may be further monitored 528 for an ACK to the UL communication from the base station 102, 310, 404, 504.

At block 804, the UE may receive the ACK from the base station while monitoring the set of symbols and the set of subcarriers of the second DL bandwidth, e.g., prior to transmitting a last repetition of the UL communication, and while in the second power mode. For example, the UE 104, 350, 402, 502 may receive 418, 530 the ACK from the base station 102, 310, 404, 504 while monitoring 410, 514 the set of symbols and the set of subcarriers of the second DL bandwidth, prior to transmitting 416, 534 a last repetition of the UL communication, and while in the second power mode 512.

At block 806, the UE may refrain, upon receiving the ACK from the base station, from transitioning from the first power mode to the second power mode in order to continue transmitting the repetition of the UL communication. For example, the UE 104, 350, 402, 502 may refrain 532, upon receiving 418, 530 the ACK from the base station 102, 310, 404, 504, from transitioning 516 from the first power mode 512 to the second power mode 508 in order to continue transmitting 416, 534 the repetition of the UL communication. In some examples, the ACK may be transmitted using a single constellation point for a particular device. Thus, the monitoring at block 606 of FIG. 6 discussed above may include monitoring for a constellation point as described with respect to FIG. 7 discussed above.

Figure 9:
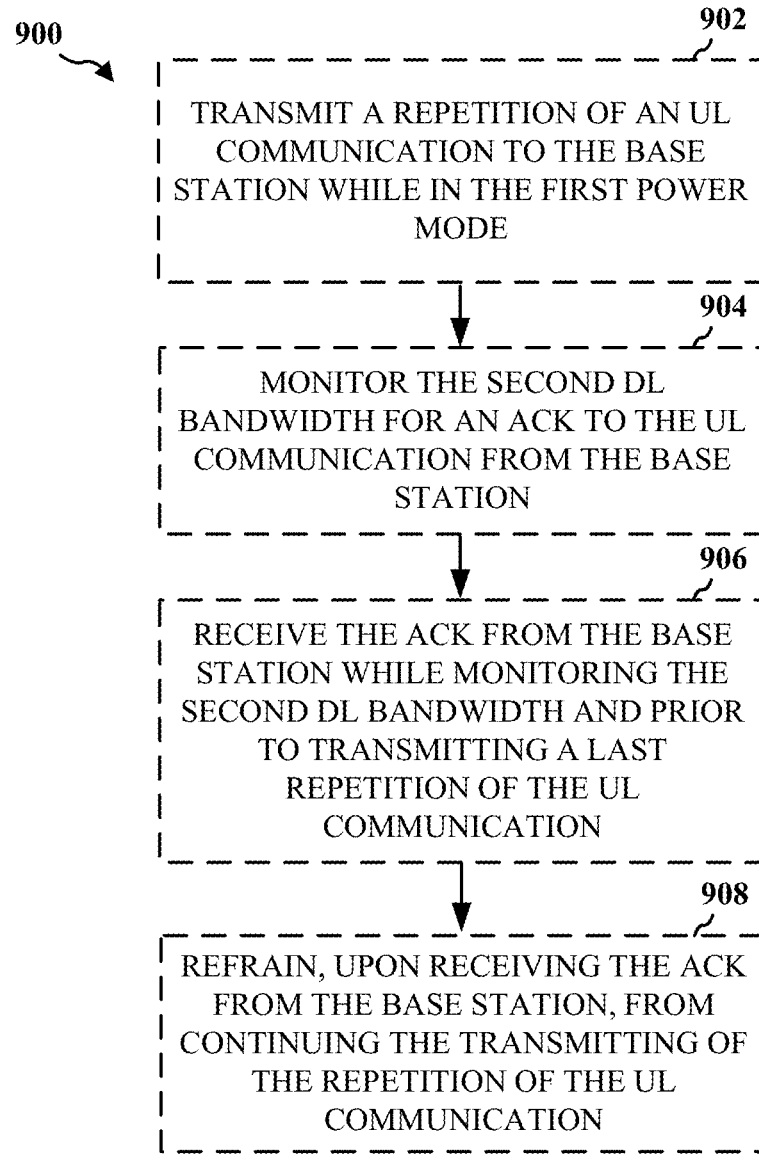
FIG. 9 is a flowchart of a method of wireless communication in accordance with the systems and methods described herein.

FIG. 9 is a flowchart 900 of a method of wireless communication in accordance with the systems and methods described herein. The method may be performed by a UE (e.g., the UE 104, 350, 402, 502).

At block 902, the UE transmits a repetition of a UL communication to the base station while in the first power mode. For example, the UE 104, 350, 402, 502 may transmit 416, 534 a repetition of a UL communication to the base station 102, 310, 404, 504 while in the first power mode 508.

At block 904, the UE monitors the second DL bandwidth for an ACK to the UL communication from the base station. For example, the UE 104, 350, 402, 502 may monitor 410, 514 the second DL bandwidth for an ACK to the UL communication from the base station 102, 310, 404, 504.

At block 906, the UE receives the ACK from the base station while monitoring the second DL bandwidth and prior to transmitting a last repetition of the UL communication. For example, the UE 104, 350, 402, 502 may receive 418, 530 the ACK from the base station 102, 310, 404, 504 while monitoring 410, the second DL bandwidth and prior to transmitting 416, 534 a last repetition of the UL communication.

At block 908, the UE may refrain, upon receiving the ACK from the base station, from continuing the transmitting of the repetition of the UL communication. For example, the UE 104, 350, 402, 502 may refrain 532, upon receiving 418, 530 the ACK from the base station 102, 310, 404, 504, from continuing the transmitting of the repetition of the UL communication. In some examples, the ACK may be transmitted using a single constellation point for a particular device. Thus, the monitoring at block 606 of FIG. 6 discussed above may include monitoring for a constellation point as described with respect to FIG. 7 discussed above.

Figure 10:
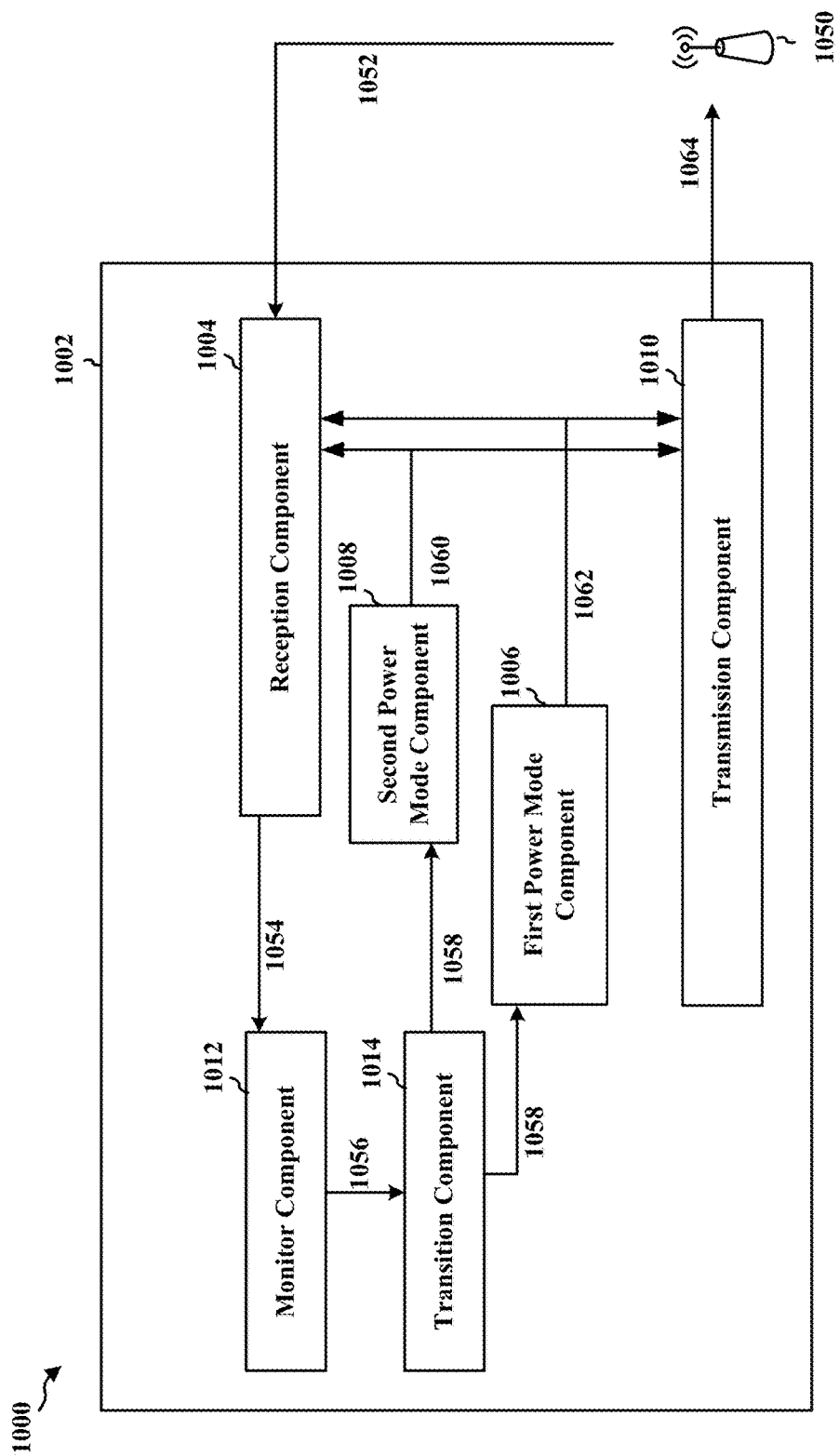
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be a UE. The apparatus 1002 includes a reception component 1004 that receives data 1052 from a base station 1050 or other device (not shown), first power mode component 1006 that operates in a first power mode, and second power mode component 1008 that operates in a second power mode. The apparatus 1002 includes a transmission component 1010 that transmits signals, a monitor component 1012 that monitors for a set of signals 1054, and a transition component 1014 that controls transitions between the first power mode and the second power mode based on information 1056 received from the monitor component 1012. The transition component 1014 may send control signals 1058 to the components 1006, 1008 to control the components 1006, 1008 and therefore the mode used, e.g., first power mode or second power mode. The components 1006, 1008 may communicate 1060, 1062 with the reception component 1004 and the transmission component 1010. The transmission component may transmit signals 1064 to the base station 1050. (The first mode components and the second mode components may include one or more of the same components, operated in different ways. For example, the first mode may have a first bandwidth and the second mode may have a second bandwidth that may be smaller than the first bandwidth. The same components or a subset of the components may be used to operate using the first bandwidth and second bandwidth.)

The apparatus may include additional components that perform each of the blocks of the algorithm in the aforementioned flowcharts of FIGS. 6-9. As such, each block in the aforementioned flowcharts of FIGS. 6-9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
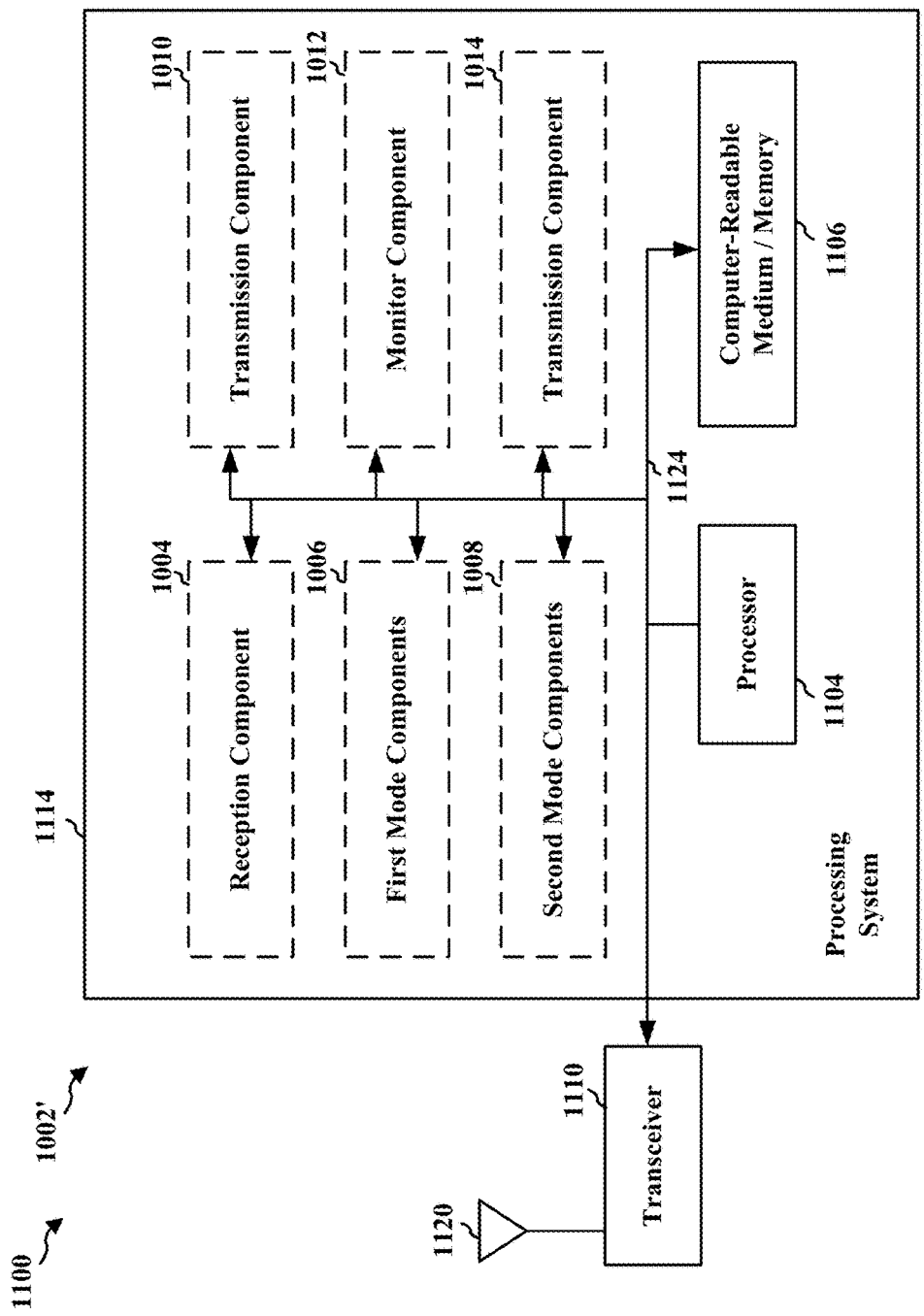
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004 receives information from the based station or other devices, e.g., through the transceiver. In addition, the transceiver 1110 receives information from the processing system 1114, specifically the transmission component 1010, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014. The components may be software components running in the processor 1104, resident/stored in the computer readable medium/memory 1106, one or more hardware components coupled to the processor 1104, or some combination thereof.

The processing system 1114 may be a component of the UE 350 and may include the memory 360 and/or at least one of the TX processor 368, the RX processor 356, and the controller/processor 359.

In one configuration, the apparatus 1002/1002' for wireless communication includes means for means for operating in a first power mode with a first DL bandwidth in association with one of a RRC idle state or an RRC connected state with a base station. The apparatus 1002/1002' for wireless communication also includes means for transitioning to a second power mode with a second DL bandwidth less than the first DL bandwidth. Additionally, the apparatus 1002/1002' for wireless communication includes means for monitoring a set of symbols and a set of subcarriers of the second DL bandwidth for an activity indicator from the base station. The apparatus 1002/1002' for wireless communication also includes means for transitioning from the second power mode to the first power mode upon receiving the activity indicator from the base station.

In another example, the apparatus 1002/1002' for wireless communication may include means for setting an inactivity timer, wherein the UE transitions to the second power mode upon expiration of the inactivity timer.

In another example, the apparatus 1002/1002' for wireless communication may include means for resetting the inactivity timer upon being scheduled with data on the DL or a UL with the base station.

In another example, the apparatus 1002/1002' for wireless communication may include means for receiving explicit signaling from the base station indicating a request to transition to the second power mode. The UE may transition to the second power mode upon receiving the request to transition to the second power mode.

In another example, the apparatus 1002/1002' for wireless communication may include means for receiving control information from the base station within the set of symbols and the set of subcarriers in the second DL bandwidth. The control information may be associated with a modulation scheme. The apparatus 1002/1002' for wireless communication may also include means for determining whether the received control information corresponds to a particular constellation point of a set of constellation points associated with the modulation scheme. Additionally, the apparatus 1002/1002' for wireless communication may include means for determining that the activity indicator is received when the received control information is determined to correspond to the particular constellation point.

In another example, the apparatus 1002/1002' for wireless communication may include means for transmitting a repetition of a UL communication to the base station while in the first power mode. The set of symbols and the set of subcarriers of the second DL bandwidth may further monitored for an ACK to the UL communication from the base station. The apparatus 1002/1002' for wireless communication may also include means for receiving the ACK from the base station while monitoring the set of symbols and the set of subcarriers of the second DL bandwidth, prior to transmitting a last repetition of the UL communication, and while in the second power mode. Additionally, the apparatus 1002/1002' for wireless communication may include means for refraining, upon receiving the ACK from the base station, from transitioning from the second power mode to the first power mode in order to continue transmitting the repetition of the UL communication.

In another example, the apparatus 1002/1002' for wireless communication may include means for transmitting a repetition of a UL communication to the base station while in the first power mode. The apparatus 1002/1002' for wireless communication may also include means for monitoring the second DL bandwidth for an ACK to the UL communication from the base station. The apparatus 1002/1002' for wireless communication may include receiving the ACK from the base station while monitoring the second DL bandwidth and prior to transmitting a last repetition of the UL communication. Additionally, the apparatus 1002/1002' for wireless communication may include means for refraining, upon receiving the ACK from the base station, from continuing the transmitting of the repetition of the UL communication.

The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
   operating in a first power mode with a first downlink (DL) bandwidth in association with one of a radio resource control (RRC) idle state or an RRC connected state with a base station;
   transitioning to a second power mode with a second DL bandwidth less than the first DL bandwidth;
   monitoring a set of symbols on a set of subcarriers of the second DL bandwidth for an activity indicator from the base station;
   receiving control information from the base station within the set of symbols on the set of subcarriers in the second DL bandwidth, the control information being associated with a modulation scheme and corresponding to the particular constellation point of a set of constellation points associated with the modulation scheme;
   determining that the activity indicator is received when the received control information is determined to correspond to a particular constellation point; and
   transitioning from the second power mode to the first power mode upon receiving the activity indicator from the base station.

2. A device implementing the method of claim 1, the device comprising a machine type communication (MTC) device or a narrowband internet-of-things (NB-IoT) device.

3. The method of claim 1, further comprising setting an inactivity timer, wherein the UE transitions to the second power mode upon expiration of the inactivity timer.

4. The method of claim 3, further comprising resetting the inactivity timer upon receiving a DL assignment or an uplink (UL) grant.

5. The method of claim 1, further comprising receiving explicit signaling from the base station indicating a request to transition to the second power mode, wherein the UE transitions to the second power mode upon receiving the request to transition to the second power mode.

6. The method of claim 1, wherein monitoring the set of symbols on the set of subcarriers comprises hopping between subframes to different subcarriers within a system bandwidth.

7. The method of claim 1, wherein the set of subcarriers comprises a series of subcarriers of a frequency hopping pattern wherein multiple activity indicators from the base station are received over the series of subcarriers before the determination is made that the activity indicator has been received.

8. The method of claim 1, wherein the set of symbols comprises a subset of symbols in a subframe, and the set of subcarriers comprises one of either 12 subcarrier or 24 subcarriers in the subframe.

9. The method of claim 1, further comprising:
   transmitting a repetition of an uplink (UL) communication to the base station while in the first power mode, wherein the set of symbols on the set of subcarriers of the second DL bandwidth are further monitored for an acknowledgment (ACK) to the UL communication from the base station;
   receiving the ACK from the base station while monitoring the set of symbols on the set of subcarriers of the second DL bandwidth while in the first power mode; and
   refraining, upon receiving the ACK from the base station, from transitioning from the first power mode to the second power mode in order to continue transmitting the repetition of the UL communication after at least one transition from the first power mode to the second power mode.

10. The method of claim 1, further comprising:
    transmitting a repetition of an uplink (UL) communication to the base station while in the first power mode;
    monitoring the second DL bandwidth for an acknowledgment (ACK) to the UL communication from the base station;
    receiving the ACK from the base station while monitoring the second DL bandwidth; and
    refraining, upon receiving the ACK from the base station, from continuing the transmitting of the repetition of the UL communication.

11. The method of claim 1, wherein the second DL bandwidth corresponds to a machine type communication physical downlink control channel (MPDCCH).

12. An apparatus for wireless communication of wireless communication of a user equipment (UE), comprising:
    means for operating in a first power mode with a first downlink (DL) bandwidth in association with one of a radio resource control (RRC) idle state or an RRC connected state with a base station;
    means for transitioning to a second power mode with a second DL bandwidth less than the first DL bandwidth;
    means for monitoring a set of symbols on a set of subcarriers of the second DL bandwidth for an activity indicator from the base station;
    means for receiving control information from the base station within the set of symbols on the set of subcarriers in the second DL bandwidth, the control information being associated with a modulation scheme and corresponding to the particular constellation point of a set of constellation points associated with the modulation scheme;
    means for determining that the activity indicator is received when the received control information is determined to correspond to a particular constellation point; and means for transitioning from the second power mode to the first power mode upon receiving the activity indicator from the base station.

13. The apparatus for wireless communication of claim 12, wherein the apparatus comprises a machine type communication (MTC) device or narrowband internet-of-things (NB-IoT) device.

14. The apparatus for wireless communication of claim 12, further comprising means for setting an inactivity timer, wherein the UE transitions to the second power mode upon expiration of the inactivity timer.

15. The apparatus for wireless communication of claim 14, further comprising means for resetting the inactivity timer upon receiving a DL assignment or an uplink (UL) grant.

16. The apparatus for wireless communication of claim 12, further comprising means for receiving explicit signaling from the base station indicating a request to transition to the second power mode, wherein the UE transitions to the second power mode upon receiving the request to transition to the second power mode.

17. The apparatus for wireless communication of claim 12, wherein monitoring the set of symbols on the set of subcarriers comprises hopping between subframes to different subcarriers within a system bandwidth.

18. The apparatus for wireless communication of claim 12, wherein the set of subcarriers comprises a series of subcarriers of a frequency hopping pattern wherein multiple activity indicators from the base station are received over the series of subcarriers before the determination is made that the activity indicator has been received.

19. The apparatus for wireless communication of claim 12, wherein the set of symbols comprises a subset of symbols in a subframe, and the set of subcarriers comprises one of either 12 subcarrier or 24 subcarriers in the subframe.

20. The apparatus for wireless communication of claim 12, further comprising:
means for transmitting a repetition of an uplink (UL) communication to the base station while in the first power mode, wherein the set of symbols on the set of subcarriers of the second DL bandwidth are further monitored for an acknowledgment (ACK) to the UL communication from the base station;
means for receiving the ACK from the base station while monitoring the set of symbols on the set of subcarriers of the second DL bandwidth while in the first power mode; and
means for refraining, upon receiving the ACK from the base station, from transitioning from the first power mode to the second power mode in order to continue transmitting the repetition of the UL communication after at least one transition from the first power mode to the second power mode.

21. The apparatus for wireless communication of claim 12, further comprising:
means for transmitting a repetition of an uplink (UL) communication to the base station while in the first power mode;
means for monitoring the second DL bandwidth for an acknowledgment (ACK) to the UL communication from the base station;
receiving the ACK from the base station while monitoring the second DL bandwidth; and
means for refraining, upon receiving the ACK from the base station, from continuing the transmitting of the repetition of the UL communication.

22. The apparatus for wireless communication of claim 12, wherein the second DL bandwidth corresponds to a machine type communication physical downlink control channel (MPDCCH).

23. An apparatus for wireless communication, comprising:
a memory; and
at least one processor coupled to the memory and configured to:
operate in a first power mode with a first downlink (DL) bandwidth in association with one of a radio resource control (RRC) idle state or an RRC connected state with a base station;
transition to a second power mode with a second DL bandwidth less than the first DL bandwidth;
monitor a set of symbols on a set of subcarriers of the second DL bandwidth for an activity indicator from the base station;
receive control information from the base station within the set of symbols on the set of subcarriers in the second DL bandwidth, the control information being associated with a modulation scheme and corresponding to the particular constellation point of a set of constellation points associated with the modulation scheme;
determine that the activity indicator is received when the received control information is determined to correspond to a particular constellation point; and
transition from the second power mode to the first power mode upon receiving the activity indicator from the base station.

24. A non-transitory computer-readable medium storing computer executable code, comprising code to:
operate in a first power mode with a first downlink (DL) bandwidth in association with one of a radio resource control (RRC) idle state or an RRC connected state with a base station;
transition to a second power mode with a second DL bandwidth less than the first DL bandwidth;
monitor a set of symbols on a set of subcarriers of the second DL bandwidth for an activity indicator from the base station; and
receive control information from the base station within the set of symbols on the set of subcarriers in the second DL bandwidth, the control information being associated with a modulation scheme and corresponding to the particular constellation point of a set of constellation points associated with the modulation scheme;
determine that the activity indicator is received when the received control information is determined to correspond to a particular constellation point; and
transition from the second power mode to the first power mode upon receiving the activity indicator from the base station.

* * * * *